United States Patent [19]

Weiss

[11] Patent Number: 4,812,232
[45] Date of Patent: Mar. 14, 1989

[54] APPARATUS FOR DECREASING THE ALCOHOL CONTENT OF ALCOHOL-CONTAINING BEVERAGES, PARTICULARLY WINE AND SPARKLING WINE

[76] Inventor: Manfred Weiss, Hinter den Zäunen 16, D-6229 Kiedrich, Fed. Rep. of Germany

[21] Appl. No.: 20,570

[22] Filed: Mar. 2, 1987

Related U.S. Application Data

[62] Division of Ser. No. 718,952, Apr. 2, 1985, Pat. No. 4,681,767.

[30] Foreign Application Priority Data

Apr. 6, 1984 [DE] Fed. Rep. of Germany ....... 3413085

[51] Int. Cl.⁴ .............................................. B01D 13/00
[52] U.S. Cl. .................................. 210/181; 210/295; 210/321.60; 210/321.6; 99/277
[58] Field of Search ............ 210/181, 259, 295, 321.6, 210/651, 652; 99/277

[56] References Cited

U.S. PATENT DOCUMENTS

| | | | |
|---|---|---|---|
| 1,280,280 | 10/1918 | Nathan | 426/16 |
| 1,302,552 | 5/1919 | Heuser | 426/16 |
| 1,800,940 | 4/1931 | Heuser | 426/493 X |
| 3,052,546 | 9/1962 | Riddell et al. | 426/15 |
| 3,291,613 | 12/1966 | Raible | 426/16 X |
| 4,265,920 | 5/1981 | Thijssen | 426/494 X |
| 4,344,826 | 8/1982 | Smith | 210/652 |
| 4,401,678 | 8/1983 | Beaumont | 426/387 X |
| 4,405,652 | 9/1983 | Boucher | 426/15 X |
| 4,499,117 | 2/1985 | Bonneau | 426/15 X |
| 4,532,140 | 7/1985 | Bonnome | 426/16 X |
| 4,581,236 | 4/1986 | Bandel et al. | 210/669 |

FOREIGN PATENT DOCUMENTS

| | | |
|---|---|---|
| 2339206 | 3/1975 | Fed. Rep. of Germany . |
| 3600352 | 7/1987 | Fed. Rep. of Germany ...... 210/651 |
| 2076852 | 12/1981 | United Kingdom . |
| WO82/02405 | 7/1982 | World Int. Prop. O. . |

OTHER PUBLICATIONS

Die Weinwirtschaft, No. 1, 13 Jan. '84, p. 25, "Wein Ohne Alkohol".
DDS RO System for Alcohol Extraction by the DDS RO Division A/S DE Danske Sukkerfabrikker, Nakskov, Denmark.

Primary Examiner—Richard V. Fisher
Assistant Examiner—Coreen Y. Lee
Attorney, Agent, or Firm—Christopher C. Dunham

[57] ABSTRACT

In a method for decreasing the alcohol content of alcohol-containing beverages, particularly wine or sparkling wine, according to the reverse osmosis process, extract substances are added to the dealcoholized beverage. In order to avoid addition of foreign water to the beverage, the alcohol-containing permeate obtained by reverse osmosis from the beverage subjected to dealcoholization is distilled in a vacuum. The permeate water produced therefrom is re-fed to the beverage subjected to the dealcoholization. The amount of permeate distillate removed from the beverage subjected to dealcoholization by the reverse osmosis and subsequent vacuum distillation, which essentially consists of alcohol, is fed to the beverage subjected to the dealcoholization in the form of water, which has also been obtained by vacuum distillation from an additional beverage. In this manner, particularly high quality sparkling wine may be produced.

5 Claims, 1 Drawing Sheet

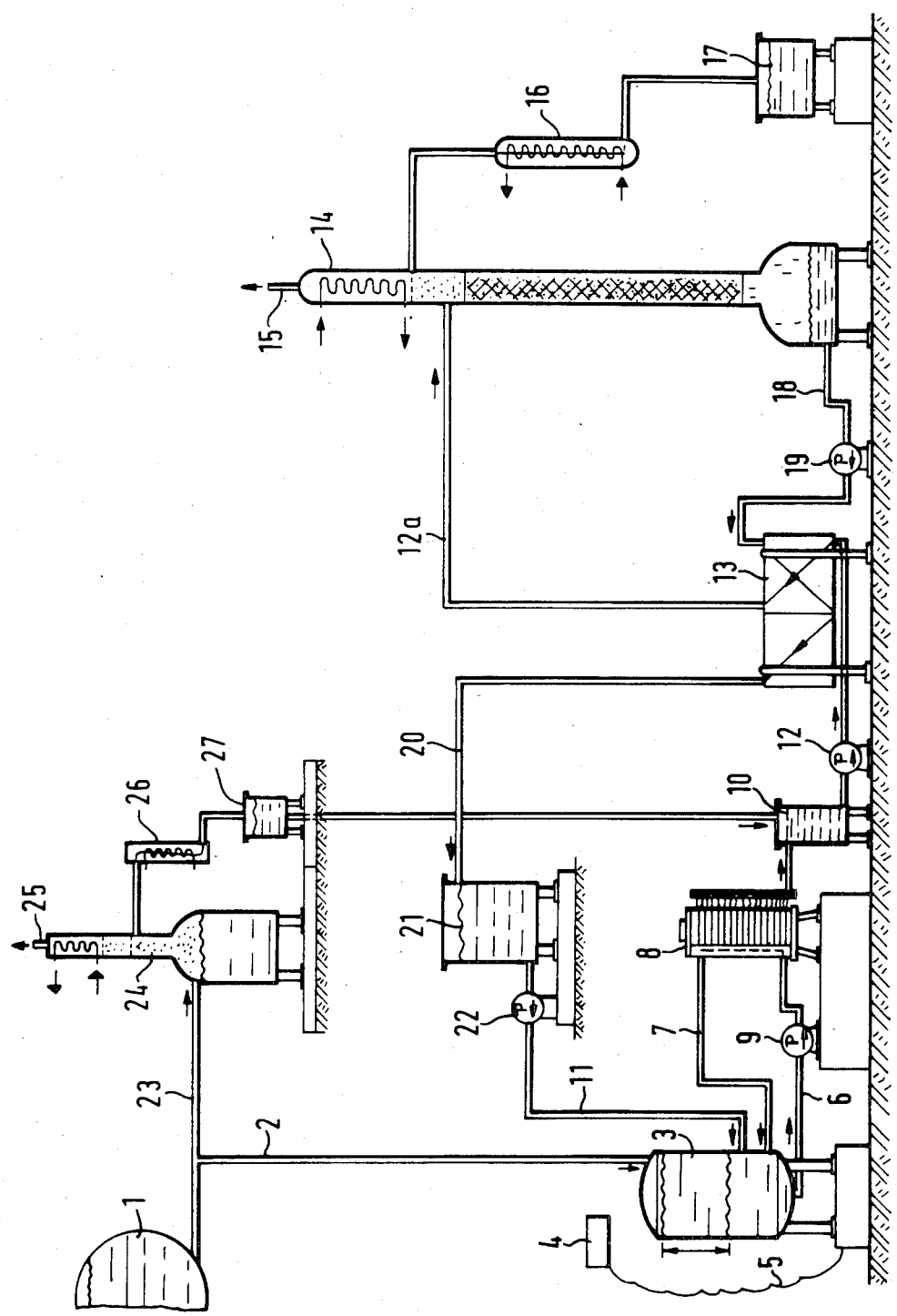

APPARATUS FOR DECREASING THE ALCOHOL CONTENT OF ALCOHOL-CONTAINING BEVERAGES, PARTICULARLY WINE AND SPARKLING WINE

CROSS-REFERENCE TO RELATED APPLICATION

This is a division of application Ser. No. 718,952, field Apr. 2, 1985 (now U.S. Pat. No. 4,681,767).

BACKGROUND OF THE INVENTION

The invention relates to a method for decreasing the alcohol content of alcohol-containing beverages, particularly wine and sparkling wine, as in accordance with the reverse osmosis method while at least aromatic substances are re-fed to the dealcoholized beverage.

A separating method of this sort, particularly in connection with alcohol extraction by hyper filtration, also termed reverse osmosis, from beer constituents the prior art (DDS RO system for alcohol extraction by the DDS RO Division A/S DE DANSKE SUKKERFABRIK-KER, Nakskov, Denmark). It is one of the advantages of this method that there is no thermal deterioration of the beer, because hyperfiltration can be conducted within a wide temperature range. During hyperfiltration, the beer is maintained under $CO_2$ pressure so that degassing or oxidation is avoided. The energy consumption finally, for this process is relatively low because the pump pressure is the only driving force.

In the application of reverse osmosis to wine, aroma losses were in the first instance experienced which however may be reduced by suitable membranes. Aromatic substances of the wine may be re-fed to the dealcoholized wine. A disadvantage however is the high water consumption for washing out the alcohol from the wine, which constitutes a multiple of the amount of wine (Die Weinwirtschaft, No. 1/13 Jan. '84, p. 25 "Wein ohne Alkohol" ("Wine without alcohol")).

With a view to the required high addition of foreign water for performing the above-mentioned reverse osmosis process, the latter is not economical. Moreover, when the foreign water is added in the form of tap water, this foreign water may lead to undesired, or non-permitted, effects on the beverage to be dealcoholized, particularly when the alcohol content of sparkling wine is to be reduced.

When decreasing the alcohol content of wine or sparkling wine, care should further be taken that not only the aroma substances should be retained but also the extraction substances which, together with the aromatic substances, form so-called component substances. In case of the reverse osmosis process, too, extract substances are removed from wine or sparkling wine to be dealcoholized, and this the more so the more alcohol is removed.

Because of the removal of the component substances, the wine or the sparkling wine cannot be dealcoholized by pressurelessly conducted dialysis as is possible in the alcohol reduction of beer. For the alcohol reduction of beer, hollow fibres of "Cuprophan" (registered Trademark) are particularly employed, which constitute a natural product from cotton linters. Alcohol reduction is obtained by the alcohol concentration gradient.

This application of the dialysis as a separation method which is possible for beer cannot simply be applied to wine or sparkling wine because the component substances of these beverages migrate through the relatively great pores of the hollow fibres and are removed together with the alcohol.

In accordance with the (German) Regulations concerning wine, liqueur wine and wine-containing beverages, the production of "sparkling beverages" is also provided on the basis of wine together with fermentation carbon dioxide or by adding carbon dioxide if the reduction of the alcohol is conducted under careful dealcoholization in the vacuum process, i.e. by vacuum distillation. In these beverages however produced from such direct distillation, a major part of the aromatic substances in the wine are missing, and in case of higher temperatures it is even possible that heat damages, such as a so-called boiling tone may appear (Die Weinwirtschaft, loc. cit.).

SUMMARY OF THE INVENTION

It is therefore the aim of the present invention to so further develop a method for decreasing the alcohol content of alcohol-containing beverages, particularly wine and sparkling wine, in accordance with the reverse osmosis method of the kind mentioned in the beginning that no addition of foreign water in the form of tap water is necessary so that the method may be performed in a more economical way. At the same time, the component substances (extract substances and aromatic substances) of the beverage to be dealcoholized, particularly wine and sparkling wine, should if possible completely be retained.

This problem is solved by the present invention wherein the alcohol-containing permeate obtained by reverse osmosis from the beverage subjected to dealcoholization is distilled, or evaporated, respectively, in a vacuum (permeate vacuum distillation); the alcohol-free permeate water produced therefrom is re-fed to the beverage subjected to the dealcoholization; and the amount of permeate distillate removed from the beverage subjected to the dealcoholization by said reverse osmosis and subsequent permeate vacuum distillation, which essentially consists of alcohol, is added as water obtained by vacuum distillation from an additional beverage.

By this two-step method it has become possible to so process, by subsequent vacuum distillation, the alcohol-containing permeate taken from the reverse osmosis process, which for instance in the dealcoholization of sparkling wine may include 6% alcohol, that the practically alcohol-free permeate water obtained as the distillation product is dosedly added to the beverage to be dealcoholized in place of foreign (tap) water. Because no foreign water is used, the dealcoholization method can economically be performed the more so if, as will later on be shown, the heat required for permeate vacuum distillation is partly recovered.

With a view to the practically exclusively selective removal of the alcohol, the originality of the treated beverage, particularly wine or sparkling wine, can above all be retained: In addition to the fact that the aromatic substances are retained, in the way characteristic for the reverse osmosis method, in the beverage, the loss experienced, in the beginning, by the reverse osmosis of extract substances is compensated for again in that these extract substances are separated by the permeate vacuum distillation together with the permeate water from the alcohol to be removed and thus may be fed again to the beverage in the permeate water.

Because permeate water is re-fed to the beverage being treated, the beverage amount rejected to dealcoholization need only be added an amount of water which is equal to the permeate distillate amount removed. The permeate distillate separated by the permeate vacuum distillation essentially includes the alcohol to be removed so that the water amount to be added to the beverage subjected to dealcoholization is correspondingly small. This small amount of water to be added may be produced, economically and of high quality, by careful vacuum distillation of an additional beverage amount.

This production of the high-quality distilled water from the additional beverage is particularly advantageously performed, in that, to start with, from the additional beverage, in a separate vacuum distillation process for the execution of which a vacuum distillation system of relatively small capacity is sufficient, a small amount of alcohol-containing beverage distillate is obtained while the beverage sump is discarded. Subsequently, the beverage distillate is passed to the permeate vacuum distillation process by which the alcohol is distilled out from the beverage distillate. Here the practically alcohol-free water is obtained in a range in which normally the permeate water is obtained. The water obtained from the additional beverage may, when using suitable method parameters, also balance the rest of the component substances, which are removed by the alcohol extraction from the beverage to be treated.

A particularly economic development of the first method step, namely of the reverse osmosis for removing the alcohol from the beverage, characterized in that the beverage subjected to dealcoholization is circulated at a defined temperature (20°-25° C.) by firstly decreasing its original volume within said reverse osmosis cycle and that when a predetermined value of the volume reduction in the beverage subjected to dealcoholization is obtained, permeate water in an amount necessary for maintaining said predetermined value is added while continuing said reverse osmosis cycle, until a predetermined amount of alcohol is separated by the subsequent permeate vacuum distillation. This procedure as compared to the common reverse osmosis for the removal of alcohol from sparkling wine has the advantage that the volume to be dealcoholized of the beverage need not in the first instance be maintained by adding foreign water but should fall down to a predetermined value which is maintained constant by adding water, here permeate water. For the removal of alcohol from wine or sparkling wine the original volume to be dealcoholized may drop to 40% before the addition of the permeate water starts. In connection with this reduction in volume it was feared that in the dealcoholization of wine or sparkling wine, tartar may crystallize out, which disadvantageously effects the membranes of the reverse osmosis system unless the original volume of the beverage is maintained. It has however shown that the reduction of the volume to 40% of the original volume is possible in wine and sparkling wine with no deterioration of the reverse osmosis process, particularly if meta tartaric acid and/or inhibitors against the crystallization of tartaric acid are added to the beverage. Such a flow of the reverse osmosis process may have a substantial influence on the economy of the two-step method for dealcoholizating, particularly of wine or sparkling wine.

From the described flow of the reverse osmosis method, which in the first instance provides for a volume reduction of the beverage subjected to the dealcoholization results that it is suitable to temporarily store the continuously obtained permeate water until it may again be added to the beverage subjected to dealcoholization. Further suitable buffer storages are provided for the permeate as well as for the beverage distillate obtained by distillation from the additional beverage. These buffers permit an advantageous sequence of the individual process steps and multiple use of the portions of the plant, particularly of the permeate vacuum distillation system. The latter may, in one phase of the process, obtain further permeate water from permeate while the distillation of the additional beverage for the production of the low alcohol containing beverage distillate is already starting from which, later on, by the same permeate vacuum distillation system water is obtained, which is added until the original volume of the beverage treated, now dealcoholized, is reached.

Prior thereto, after the separation of the desired amount of alcohol from the beverage subjected to dealcoholization, the temporarily stored permeate water and permeate are re-fed to the dealcoholized beverage treated.

$CO_2$-containing beverages dealcoholized according to the present method, particularly quality sparkling wines retain, in a particularly advantageous way, their original properties, while only a decrease of the $CO_2$ content may be experienced. When treating sparkling wine, a decrease of the $CO_2$ content from 6 bar for about 1 bar to 5 bar might be experienced. The reduction of the $CO_2$ content necessarily experienced is negligible for the final product if the original product is provided with a $CO_2$ content which is correspondingly higher.

The invention in a further aspect contemplates the provision of apparatus provided for performing the method of the invention. The advantages of such apparatus can already be taken from the described advantages of the methods performed thereby.

Referring to the single FIGURE of the drawing, apparatus in accordance with the invention for decreasing the alcohol content of alcohol-containing beverages, particularly wine or sparkling wine, and comprising a reverse osmosis system through which the beverage subjected to dealcoholization is passed, as well as means at least for refeeding aromatic substances to the dealcoholized beverage, is characterized in that a permeate vacuum distillation system 14 to be fed with the alcohol-containing permeate obtained from the reverse osmosis system 8 is provided, that means (permeate duct 18, 20, pump 19, permeate water collector container 21, pump 22, feeder duct 11) for re-feeding alcohol-free permeate water obtained from the permeate by means of the permeate vacuum distillation system 14 to the beverage subjected to dealcoholization are provided, and that a beverage vacuum distillation system 24 for obtaining water from said beverage is provided, which, in addition to the permeate water may be fed into the beverage subjected to dealcoholization to maintain a predetermined volume. This apparatus combination constitutes the portions of the apparatus provided for performing the two-step method for the removal of the alcohol from the beverage, the reverse osmosis system and the permeate vacuum distillation system including its essential modules, as well as a beverage vacuum distillation system for obtaining a small amount of additional water from the beverage which is provided to obtain the original volume of the beverage subjected to dealcoholization.

In specific embodiments, the apparatus of the invention is further characterized in that means (beverage distillate collector container 27, permeate collector container 10) for feeding the low alcohol containing beverage distillate obtained from said beverage vacuum distillation system 24 into said permeate vacuum distillation system 14 are provided. Thus the temporary storages for buffering various liquids obtained in the total process are provided so that the method flow described may be executed by multiply using some of the portions of the system and within a very short period of time of the whole alcohol removal process.

A high pressure pump 9 for the reverse osmosis system may be inserted into a beverage duct 6 from the beverage dealcoholization container 3 to the reverse osmosis system 8. This, in the first step of the total process for removing the alcohol from the beverage, is the only one which requires energy. The energy consumption is particularly low though because, as given in the description of the preferred reverse osmosis procedure, the volume of the beverage subjected to dealcoholization may drop to a predetermined value so that correspondingly smaller amounts are to be moved by the reverse osmosis system. In order to advantageously provide the second process step for removing the alcohol from the permeate by vacuum distillation more favorably, too, energy-wise, the permeate duct 12a and the permeate water duct 18 may be thermally coupled to each other through a temperature exchanger 13.

An exemplified method for decreasing the alcohol content of quality sparkling wine from 11 to 5% is described in the following together with a typical system provided therefor.

The system for decreasing the alcohol content from quality sparkling wine is schematically shown in the drawing:

BRIEF DESCRIPTION OF THE DRAWING

The single FIGURE schematically shows apparatus embodying the invention for decreasing the alcohol content of quality sparkling wine.

DETAILED DESCRIPTION

In the plant shown in the drawing, ready quality sparkling wine is stored in a reservoir container 1 the alcohol content of which sparkling wine is to be reduced from about 11 vol % to about 5 vol %.

From the reservoir container leads a duct 2 to a dealcoholization container 3 into which a predetermined starting volume of quality sparkling wine is fed which is thus subjected to dealcoholization.

In order to find the original volume and the volumes resulting in the course of the dealcoholization in the dealcoholization container, a so-called sparkling wine scales 4 is employed which is connected via an electrical conductor 5 to a generator not shown. The volume subjected to dealcoholization can, however, also be determined by means of a volumetric meter.

The dealcoholization container is connected, via a forward duct (beverage duct) 6 and a back flow duct 7, to a reverse osmosis system 8.

A suitable reverse osmosis plant for instance is supplied by De Danske Sukkerfabrikken AG, Nakskov, Denmark, Type HR 95. It comprises a 2-square-meter plane including round 2-component membranes having a diameter of about 20 cm sandwiched one upon the other.

A high-pressure pump 9 serves for moving the sparkling wine into a cycle through a reverse osmosis system 8, the backflow duct 7, the dealcoholization container 3 and the forward duct 6. In the course of this process, the reverse osmosis system separates the permeate, which constitutes a clear neutral aqueous liquid containing about 6 vol % alcohol. The permeate is supplied to a permeate collector container 10.

The described circulation of the sparkling wine through the reverse osmosis system is, in the beginning, performed with no water added (permeate water obtained in a way to be described later) through a feeder duct 11 until the volume of the sparkling wine being treated in the dealcoholization container 3 has been decreased to about 40% of its original volume.

Subsequently, while continuing the sparkling wine circulation, permeate water is added through feeder duct 11 into the dealcoholization container in order to maintain the volume reduced to 40%.

In order to obtain the permeate water and to return the flow into the dealcoholization container, the permeate is pumped, from the permeate collector container 10 via a pump 12 and a temperature exchanger 13 into a permeate vacuum distillation system 14. A connection 15 for a vacuum pump is indicated in the drawing. A glass vacuum distillation system as supplied by QVR Klar-Glastechnik GmbH, Wiesbaden-Schierstein, Federal Republic of Germany, may suitably be employed as the permeate vacuum distillation system.

In the permeate vacuum distillation system, the permeate is separated, at a temperature of about 50° C., into permeate water containing less than 0.2 vol % alcohol and into a permeate distillate consisting of about 90% alcohol and flowing via a cooler 16 into a permeate distillate collector container 17.

The warm permeate water flows through a permeate duct 18, a pump 19, through the temperature exchanger 13, a further section of the permeate duct 20 into a permeate water collector container 21. From the latter, the permeate water may in good time be fed via a pump 22 and feeder duct 11, which may also be considered a section of the permeate water duct, into the dealcoholization container 3. As mentioned before, the feeding of the permeate water into the dealcoholization container by pump 22 starts if and when the original volume of the sparkling wine subjected to dealcoholization has been reduced to the predetermined value of 40%. During the continuing further reverse osmosis process so much permeate water is continuously pumped into the dealcoholization container that the predetermined reduced volume is maintained until the end of the alcohol removal process. The alcohol removal process is finished as soon as the corresponding volume of alcohol, inclusive of the remaining substances contained in the permeate distillate is obtained in the permeate distillate collector container 17 subsequent to the permeate distillation system.

As a summary, here are the characteristic data of the described method for the dealcoholization of quality sparkling wine, the alcohol content of which is to be reduced from 11 vol % to 5 vol %:

Original volume of sparkling wine 100 l in the dealcoholization vessel

Carbon dioxide pressure about 6 bar

Sparkling wine temperature 20° C.

Pressure in the reverse osmosis system: 60 bar.

Conducting the sparkling wine in the reverse osmosis cycle until about 40% of the original volume are obtained in the dealcoholization container, subsequently addition of permeate water to keep constant about 40% of the original volume.

Separation of the permeate water from the permeate by vacuum distillation at about 50° C.:

Permeate water having less than 0.2 vol % alcohol
Alcohol having about 90 vol %.

Separation of 6.7 l permeate distillate by permeate vacuum distillation corresponding to 6 l pure alcohol.

Obtaining 6.7 l water from additional sparkling wine by sparkling wine vacuum distillation:

Dealcoholization of the additional sparkling wine to less than 0.5 vol % by means of a beverage vacuum distillation system 24 into which system beverage is fed via a conduit 23 and which delivers cooled sparkling wine distillate cooled in a cooler 26 to a beverage distillate collector container 27 while alcohol is exhausted through a connection 25.

Separation of the sparkling wine distillate so obtained by the next step of the vacuum distillation (permeate vacuum distillation) in water and alcohol of about 90 vol %.

Addition of the 6.7 l water obtained by vacuum distillation from the additional sparkling wine to 93.3 l sparkling wine in the dealcoholization container.

At the end of the dealcoholization process, 100 l quality sparkling wine having 5 vol % alcohol and a $CO_2$ pressure of about 5 bar /20° C. have been obtained.

I claim:

1. In apparatus for decreasing the alcohol content of alcohol-containing beverages including reverse osmosis means for subjecting a beverage, initially containing alcohol, to reverse osmosis thereby to produce a dealcoholized beverage and an alcohol-containing permeate, and means for refeeding at least aromatic substances to said dealcoholized beverage, the improvement which comprises:

(a) first vacuum distillation means (14), receiving said permeate from said reverse osmosis means (8), for distilling said permeate ot obtain therefrom alcohol-free permeate water;

(b) means (18, 20, 19, 21, 22, 11) for feeding said permeate water from said first vacuum distillation means to the beverage subjected to reverse osmosis; and (c) second vacuum distillation means (24) for obtaining water from a beverage for feeding, in addition to said permeate water, into the beverage subjected to reverse osmosis to maintain a predetermined volume of the last-mentioned beverage.

2. Apparatus as defined in claim 1, wherein said second vacuum distillation means (24) comprises means for producing, from a beverage initially containing alcohol, a low-alcohol-containing beverage distillate; and further including means (27, 10) for feeding said beverage distillate to said first vacuum distillation means.

3. Apparatus as defined in claim 2, further including a first container (3) for the beverage subjected to reverse osmosis; wherein said permeate water feeding means comprises a second container (21) for collecting said permeate water, and a duct (18, 20) connecting said first vacuum distillation means (14) to said first container, said second container being connected in said duct between said first vacuum distillation means and said first container; and wherein said means for feeding said beverage distillate comprises a third container (10) for collecting said permeate, a fourth container (27) for collecting said beverage distillate and from which said beverage distillate is fed to said third container, and a drain for conducting said beverage distillate from said second vacuum distillation means (24) to said fourth container.

4. Apparatus as defined in claim 1, further including a container (3) for the beverage subjected to reverse osmosis, a duct (6) for conveying beverage from said container to said reverse osmosis means (8), and a high-pressure pump (9) connected in said duct.

5. Apparatus as defined in claim 1, further including a first duct (12a) for conducting said permeate to said first vacuum distillation means (14); wherein said permeate water feeding means includes a second duct (18) for conducting permeate water from said first vacuum distillation means; and further including heat-exchange means (13) for thermally coupling said first and second ducts to each other to effect heat transfer therebetween.

* * * * *